May 1, 1934.                    E. C. ROSENOW                    1,956,836
                                VALVE STRUCTURE
                             Filed Oct. 8, 1931          2 Sheets-Sheet 1
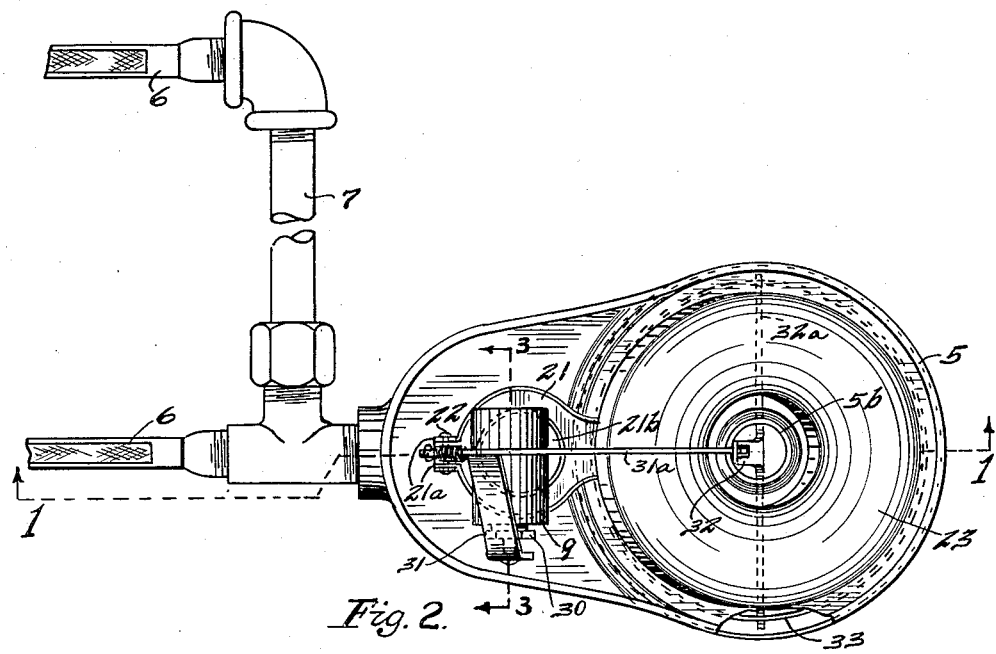
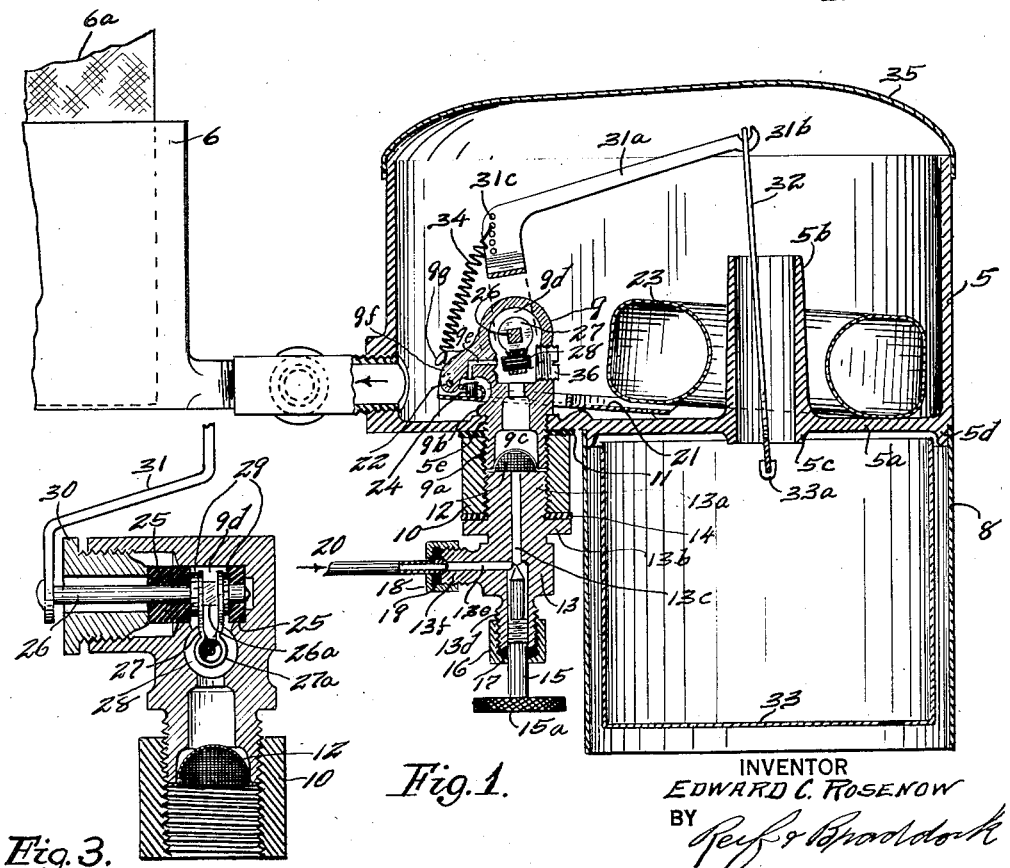
INVENTOR
EDWARD C. ROSENOW
BY
ATTORNEY

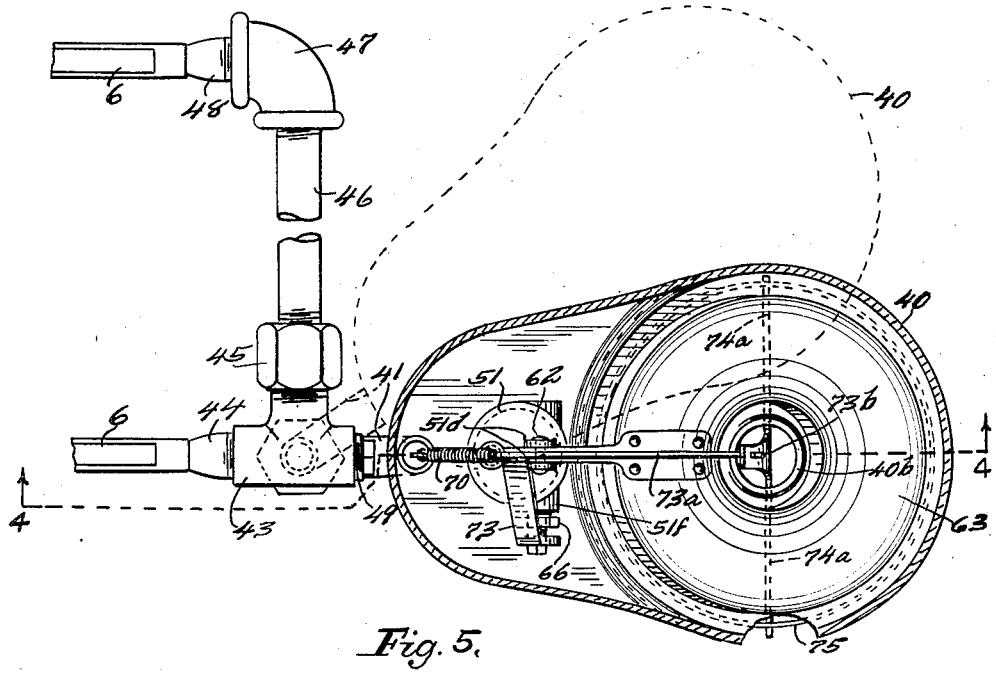

Patented May 1, 1934

1,956,836

UNITED STATES PATENT OFFICE 1,956,836

VALVE STRUCTURE

Edward C. Rosenow, Rochester, Minn.

Application October 8, 1931, Serial No. 567,626

4 Claims. (Cl. 251—125)

This invention relates to a liquid controlling device including a means or valve for regulating the supply of water to a receptacle. While the device might have various applications, one application which has been made in practice is that for regulating the supply of water to a humidifier. With a receptacle used for containing liquid in a humidifier such as used in dwelling rooms, and in various other receptacles, it is desirable to have means which will regulate the supply of water from a pipe connected to a source such as the city mains, in a safe and simple manner, and it is desirable to have a further means which will act in case the first means fails to function to shut off the supply of water after a certain amount has accumulated in said receptacle.

It is an object of this invention, therefore, to provide a simple and compact means for effectively regulating the supply of water to a receptacle.

It is a further object of the invention to provide a device for regulating the supply of liquid to a receptacle having an overflow opening comprising means operated by a float adjacent said opening for shutting off the supply when the water reaches a certain level, and a further gravity actuated means operating through said opening to shut off said supply if the water for any reason should rise a certain distance above said level.

It is still another object of the invention to provide a device for regulating the supply of liquid to a receptacle, which receptacle has a spout therein with an overflow opening passing therethrough comprising a float of annular shape surrounding said spout, float controlled means for shutting off the supply of water to said receptacle, and a gravity lever controlled means for also shutting off the supply of water to said receptacle, said lever also extending towards said float and being operated by an overflow vessel disposed below said float.

It is more specifically an object of the invention to provide a device for regulating the supply of water to a receptacle, which receptacle has a bottom with a spout upstanding therefrom having an overflow opening therethrough, comprising a hollow member for supplying water to said receptacle at one side of said spout, a float having an opening therein surrounding said spout and pivotally connected to said member, said member having a passage therethrough through which water is supplied, means operated by said float for closing the outer end of said passage, a lever fulcrumed in said member and having an arm therein carrying means for closing the inner side of said passage, said lever carrying a support extending through said spout for supporting a vessel for receiving overflow liquid therethrough and swinging said lever to close the inner end of said passage.

These and other objects and advantages of the invention will be fully set forth in the following description made in connection with the accompanying drawings, in which like reference characters refer to similar parts throughout the several views and in which:—

Fig. 1 is a vertical section taken on line 1—1 of Fig. 2, as indicated by the arrows;

Fig. 2 is top plan view of the device;

Fig. 3 is a vertical section taken on line 3—3 of Fig. 2, as indicated by the arrows;

Fig. 4 is a vertical section taken on line 4—4 of Fig. 5, showing a modification;

Fig. 5 is a top plan view of the device shown in Fig. 4; and,

Fig. 6 is a horizontal section taken on line 6—6 of Fig. 4.

Referring to the drawings, a receptacle 5 is shown, adapted to contain liquid and to which liquid is supplied to maintain a certain level therein. While this receptacle may contain liquid for various purposes, in the embodiment of the invention illustrated it is shown as connected to a pair of narrow troughs 6 in which absorbent material in the form of sheets 6a is disposed. Liquid is supplied to the troughs 6 through a pipe line 7 connected to trough 6 and receptacle 5 by appropriate pipe fittings. The receptacle 5 has a bottom wall portion 5a from which upstands a spout 5b having an opening therethrough constituting an overflow opening, said spout having a short projection or hub portion 5c below said bottom. Receptacle 5 has a cylindrical flange 5d projecting from its bottom, to which is secured a cylindrical open ended casing 8. The bottom wall 5a has a threaded opening 5e at one side of spout 5b in which is secured the threaded stem 9a of a member 9, member 9 having a flange 9b engaging a raised portion on the bottom 5a surrounding opening 5e. A nut 10 is threaded on stem 9a and engages a gasket washer 11 disposed between the same and the bottom 5a. Member 9 has a passage 9c extending vertically therethrough in the lower end of which is disposed a flanged semi-spherical screen 12. The flange of the screen 12 is clamped between the bottom of the threaded stem 9a and the top of the threaded stem 13a of a valve member 13 screwed into the lower end of the nut 10 and having a flange 13b between which and the bottom of nut 10 is disposed a gasket washer 14. Member 13 has a downwardly extending bore or passage 13c therethrough enlarged at its lower end to form a valve seat and threaded to receive a threaded stem 15 carrying an operating knurled handle or wheel 15a. Stem 15 is pointed at its inner end to form a needle valve adapted to close passage 13c. Valve 13 has a downwardly projecting threaded portion 13d receiving a packing cap 16 containing packing material 17 surrounding stem 15. Member 13 has a laterally extending passage 13e communicating with the enlarged portion of passage 13c and extending through a laterally projecting threaded stem 13f on which is screwed a packing cap 18 containing packing 19 surrounding a tube 20 having a conical end held against the conical recess at the end of passage 13e. Passage 9c in member 9 opens into a chamber 9d from which chamber 9e leads to the outer side of member 9. Passage 9e has a horizontal portion terminating at the inner face of wall of member 9 and a connecting vertical portion terminating in a small boss on the exterior face of the wall of member 9, said latter passage being shown as extending downwardly. Member 9 has a lug 9f projecting downwardly at the side remote from spout 5b and an arm 21 has spaced end lugs 21a disposed respectively at the sides of lug 9f and pivotally connected thereto by a headed and nutted bolt 22 extending through lug 9f. Arm 21 has an opening 21b therethrough through which member 9 projects, and said arm is secured at its other end to a float member 23 of annular shape and through the central opening of which spout 5b projects. Arm 21 has a reversely bent portion having an aperture in which is secured a lug 24 of yielding material such as rubber. Lug 24 is disposed centrally of the outer portion of passage 9e. Chamber 9d at one side is bored to receive resilient blocks 25 of comparatively stiff rubber or similar material through which extends a shaft 26. Shaft 26 has an angular or square portion 26a between members 25 passing through the spaced portions of an arm 27 having a loop 27a in which is secured a yielding member 28 of rubber or similar material. Member 27 is shown as formed of sheet material. Member 27 is disposed centrally of the inner end of passage 9e. Washers 29 are disposed on shaft 26 at the outer sides of arm 27 and between said arms and the blocks 25. Passage 9d is enlarged at one side and interiorly threaded to receive a flanged plug 30 which engages the outer block 25. Shaft 26 is fixedly connected with the inner faces of the blocks 25 about the shaft and these blocks are tightly pressed into the inner end of chamber 9d by the plug 30, and held in fixed position at the walls of said chamber. The shaft 26 is therefore rotatable within the chamber 9d only as the blocks 25 flex for permitting such rotation. Shaft 26 is headed at its outer end and has secured thereto just inside of said head a lever arm 31. This arm extends upwardly over the top of member 9 and has a laterally projecting portion 31a having a hook 31b at its terminal disposed substantially centrally over the top of spout 5b. Arm 32 is apertured to engage the hook 31b and extends downwardly through the opening in spout 5b and has laterally and oppositely extending portions 32a which are of hook formation and extend through openings 33a in the opposite sides of the cylindrical vessel 33 which is thus suspended on said portions. Lever 31 has a plurality of holes 31c at its angle portion, in any one of which the upper end of a coil spring 34 is adapted to be secured, the lower end of said spring being formed with an eyelet which is hooked over a projection or hook-like lug 9g disposed above lug 9f. This spring 34 normally holds the valve member 28 open as shown in Fig. 1. A cover 35 is shown having a flange fitting over the top of receptacle 5. Member 9 is provided with an aperture in the side adjacent spout 5b through which arm 27 is inserted. This aperture is threaded and is closed by a plug 36.

In operation it is desired to maintain a certain level of liquid in receptacle 5 which level will be somewhat below the top of the spout 5b. Water will be supplied to the device from some suitable source such as the city mains to which tube 20 will be connected. When valve 15 is open, the liquid can flow from pipe 20 through passages 13e and 13c through the screen 12 into the chamber 9c and from this chamber into the chamber 9d. Water can pass from chamber 9d through passage 9e into receptacle 5. When water is below the desired level, float 23 is in a lowered position and arm 21 holds the member 24 away from the outer end of passage 9e so that water can pass therethrough. When the water reaches the desired level in the receptacle 5, float 23 is raised, raising arm 21 and moving resilient block 24 against the outer end of passage 9e and the small boss surrounding said passage so that further passage of the water to receptacle 5 is prevented. Water is thus maintained at the desired level. In the embodiment of the invention illustrated water can pass from the receptacle 5 to the trough 6 where it will assume the same level as in receptacle 5 and the absorbent sheets 6a will be moistened or saturated. Should the water not be shut off by member 24 for any reason, the same will rise in receptacle 5 until the level reaches the top of spout 5b when the water will run through said spout and into the vessel 33. When liquid accumulates in vessel 33 the weight thereof moves the vessel downwardly and arm 31a of lever 31 is swung downwardly against the tension of spring 34 and shaft 26 is rotated, flexing the resilient members 25 so that arm 27 is oscillated and the resilient member 28 is moved against the inner end of passage 9e and the small boss surrounding said passage so that passage of the water through movement 9e is prevented. The supply of water to receptacle 5 is thus again cut off with the level of the water at the top of spout 5b. It is thus seen that if the valve constituting member 24 does not function properly, the valve comprising member 28 will function for shutting off the supply of water.

In the modification shown in Figs. 4 to 6, a receptacle 40 is shown, corresponding to receptacle 5, which has a bottom portion with a tapped hole 40a therein closely adjacent one side, into which is screwed one end of a U-shaped pipe or nipple 41. Member 41 is connected at its other end by a coupling 42 to the lower end of a four-way T 43. Member 43 has secured to one end thereof a connection 44 leading to the trough 6 and is connected by coupling 45 to a pipe 46 connected by an elbow 47 and a coupling 48 to the other trough 6, the trough 6 being the same as shown in Figs. 1 and 2. The end of the T member 43 opposite connection 44 is closed by a plug 49. It will be understood that the troughs 6 as shown in both the Figs. 1 and 2 and 4 and 5 will be supported by a radiator or other support and that the receptacles 5 and 40 are supported by said troughs and the connections thereto. The receptacle 40 has a spout 40b upstanding from the bottom and said casing has a cylindrical flange 40c at the exterior of its bottom portion about which is fitted and to which is secured a casing 50 of cylindrical form and which extends some distance below said flange. Receptacle 40 also has a tapped hole therein between the hole 40a and spout 40b in which is screwed the threaded reduced portion 51a of a hollow member or shell 51, the same having a flange 51b about portion 51a which engages the raised portion or boss on the bottom of member 40 surrounding the opening in which portion 51a is disposed. Portion 51a is engaged below receptacle 41 by a coupling member 52 threaded thereon and engaging the bottom of receptacle 40. A valve member 53 has a reduced portion threaded into the lower portion of member 52, the same having a flange 53a engaging a gasket 54 disposed between said flange and the bottom of member 52. Member 53 has a downwardly projecting portion in which is threaded a valve rod 55 having a wheel handle 56 at its lower end and which has its inner end 55a pointed to form a valve adapted to cooperate with a seat formed at the lower end of a bore 53b extending through valve body 53 and communicating with the interior of the member 51. A screen 57 of semi-spherical form has a circular flange disposed between and engaged by the lower end of portion 51a and the upper end of valve body 53. The lower portion of member 53 is exteriorly threaded to receive a packing member 58 threaded thereon and which has packing material 58a in its end which is compressed about the rod 55. Member 53 has a laterally projecting portion with a bore 53c therethrough, the end of said portion being provided with a conical recess in which is disposed the conical end of pipe or tube 59 through which liquid is supplied to members 53 and 51. A coupling member 60 is threaded on the laterally projecting portion of member 53 and engages tube 59 to hold its end into close engagement with member 53.

Member 51 has a passage 51c extending through its top wall, which top wall is substantially horizontal and the top wall has bosses at both ends of passage 51c. Member 51 has a pair of spaced upstanding lugs 51d at the top thereof between which is disposed a float lever 61 pivoted by the pivot 62 to the lugs 51d, said pivot being shown as in the form of a headed rivet. Lever 61 has one end secured to a float member 63 shown of annular form, thus having an opening in its center, and through which opening extends the spout 40b. Lever 61 has its other end tapped to receive a screw 64 having its upper end slotted and its lower end recessed to receive a plug 65 of resilient material such as rubber. Said block 65 is constructed and arranged to be depressed over the outer end of passage 51c and against the boss surrounding said passage to close said passage. Member 51 has bosses 51e and 51f therein and boss 51e is bored and threaded to receive a gland 66 having a flange of polygonal shape, the inner end of said gland disposed in the boss 51e engaging a block 67 of resilient material such as rubber. A shaft 68 extends through gland 66, being spaced from the walls thereof, and said shaft has a portion 68a of square or angular formation adapted to receive the apertured ends of a U-shaped arm 69 having a substantially cylindrical bead portion in which is clamped another block 70 of rubber or similar resilient material. The arm 69 is thus carried rigidly on the shaft 68 in such arrangement that the block 70 is adapted to be pressed against the inner end of passage 51c and the boss surrounding the same to close said passage. Shaft 68 has a pair of washers 71 disposed at the outer sides of the arms 69 respectively, one of these washers engaging block 67 and the other engaging a block 72 of rubber or resilient material disposed in a bore in the boss 51f and into which block extends the inner end of shaft 68. The blocks 67 and 72 are fixedly connected with the shaft 68 at their inner faces which engage the shaft and are fixedly connected with the casing member 51 at their peripheral surfaces, with the result that the shaft can rotate with respect to the casing member only as the blocks flex for permitting such movement. Boss 51f has a further smaller bore therein to accommodate the inner end of shaft 68 so that said shaft does not engage any part of the member 51. A lever 73 is rigidly secured to shaft 68 being riveted on one end of said shaft as shown in Fig. 6, which lever extends upwardly at one side of member 51 and has an arm 73a extending toward spout 40b, the same having a hooked end 73b disposed substantially over spout 40b. The hooked end 73b is engaged by the apertured end of an arm 74 which extends downwardly through spout 40b and has oppositely extending portions 74a having hooked portions at their outer ends extending through apertures 75a in a cylindrical receptacle 75, said receptacle 75 thus being suspended on the arms 74a and thus carried by the arm 74. Lever 73a is normally held in position with plug 70 spaced from passage 51c by a tensile coiled spring 76 having a hook at one end adapted to be disposed in any one of a plurality of holes 73c in lever 73 and secured at its other end to an arm 77 secured to and projecting from member 51. Receptacle 40 has a cover 78 extending over the top thereof and having a depending flange embracing the top of said receptacle.

In operation the water will be supplied through the pipe 59 and when the valve wheel 56 is turned, to open valve 55a, the water will pass upwardly through bore 53b and through the screen 57. All solid matter or sediment will be removed by the screen 57 and the water will pass into member 51. The water will pass out through opening 51c and into receptacle 40. When the water reaches a certain level in said receptacle, float 63 rises and lever 61 is swung to bring the block 65 against the top of passage 51c and the boss surrounding the same so that further delivery of water to receptacle 40 is prevented. The water passes through member 41 and the connections therefrom to the troughs 6 and will be maintained at the desired level therein. If for any reason the float 63 should not act to cause plug 65 to shut off the water, the water will continue to rise in the receptacle 40 and will eventually overflow through the spout 40b. The water will run into the vessel 75 and when a certain amount has been received in this vessel, the vessel will descend by gravity and will swing arm 73a of lever 73, thus swinging arm 69 and causing the block 70 to be moved against the inner end of passage 51c so that water will be prevented from passing out of member 51. It will be noted that member 70 moves in the same direction as the flow of water from member 51 and the pressure of the water will tend to keep member 70, which acts as a valve, in closed position. The lever 73, therefore, and attached parts, acts as a safety device to shut off the supply of water.

The receptacle 40 can be swung about the axis of coupling 41 and may be moved to the position shown in dotted lines in Fig. 5 if desired. It is also possible to move receptacle 40 about the axis of the hole 40a in the initial adjustment of the device. Member 40 can thus be disposed entirely at the ends of the troughs 6. Said blocks thus also tend to move member 70 away from the passage 51c. As in the showing in Figs. 1 to 3, there is no metal-to-metal contact of the moving parts of lever 73. Shaft 68 is not in engagement with gland 66, nor with member 51, but engages only the rubber blocks 67 and 72. It will be noted that receptacle 75 does not touch the casing 50 and rod 74 does not touch the spout 40b.

From the above description it is seen that applicant has provided a very simple and compact device for regulating a water supply. By having the float surrounding the overflow spout 5b and the overflow vessel directly below the spout with the lever extending toward the spout, the parts are contained in a very small area and the device can be made small and compact. At the same time, the parts are comparatively few in number and can be made quite rugged.

The proper functioning of the auxiliary or safety shut off valve comprising members 28 and 70 is made doubly sure, due to the fact that said members also move to their valve seats in the same direction as the liquid moves or flows and thus do not act against the liquid. It therefore does not have to oppose any liquid pressure in order to close tightly. It will also be noted that there is no metal-to-metal contact in the moving parts of the valve. Shafts 26 and 68 are carried in the resilient or rubber members and these resilient members are also engaged by the washers at either side of members 27 and 69. Said shafts 26 and 68 do not engage the plugs 30 or 66. The levers 31 and 73 thus swing without metal-to-metal contact. Said levers are rigidly connected to their shafts. The members 32 and 74 also pass through the overflow spouts without touching the same, so that there is no contact of metal against metal at this part of the device. The cylindrical overflow vessel also moves in spaced relation to its casing. With such absence of metal-to-metal contact, any tendency for the device to become stuck due to rust or other adhesion, is eliminated. This is important, as the auxiliary or emergency valve which is operated by the lever may act only at long intervals. The valve operated by the float lever will be actuated quite frequently and there is little chance for its pivot 22 or 62 to stick.

It will, of course, be understood that various changes may be made in the form, details, arrangement and proportions of the parts, without departing from the scope of the invention, which generally stated, consists in a device capable of carrying out the objects above set forth, in the parts and combinations of parts disclosed and defined in the appended claims.

What is claimed is:—

1. In a device of the type described, the combination of a valve housing, a rock shaft extending into said valve housing through an opening in the wall thereof, a resilient block filling said opening about said shaft, a second resilient block about said shaft in spaced relation to said first named block, an arm on said shaft between said blocks adapted to rock with the shaft, and a valve member movable by said arm into operative position for preventing passage of water through said housing, said resilient blocks being non-rotatably connected at their inner faces with said rock shaft and non-rotatably connected at their outer faces with said housing whereby said rock shaft is rotatable only upon a torsional flexing of said blocks.

2. In a device of the type described, the combination of a valve housing, a rock shaft extending into said valve housing through an opening in the wall thereof, a resilient block filling said opening about said shaft, a second resilient block about said shaft in spaced relation to said first named block, an arm on said shaft between said blocks adapted to rock with the shaft, a valve member movable by said arm into operative position for preventing passage of water through said housing, said resilient blocks being non-rotatably connected at their inner faces with said rock shaft and non-rotatably connected at their outer faces with said housing whereby said rock shaft is rotatable only upon a torsional flexing of said blocks, and means for applying pressure longitudinally of the shaft on said blocks.

3. In a device of the type described, the combination of a valve housing, a rock shaft extending into said valve housing through an opening in the wall thereof, a resilient block filling said opening about said shaft, a second resilient block about said shaft in spaced relation to said first named block, an arm on said shaft between said blocks adapted to rock with the shaft, a valve member movable by said arm into operative position for preventing passage of water through said housing, said resilient blocks being non-rotatably connected at their inner faces with said rock shaft and non-rotatably connected at their outer faces with said housing whereby said rock shaft is rotatable only upon a torsional flexing of said blocks, and a plug adjustably mounted in said housing about said shaft in spaced relation thereto for applying pressure longitudinally of the shaft on said blocks.

4. In a device of the type described, the combination of a valve housing, a rock shaft extending into said valve housing through an opening in the wall thereof and having a portion angular in cross section within said housing, a resilient block filling said opening about said shaft adjacent to said angular portion, a second resilient block about said shaft in spaced relation to said first named block along said shaft, an arm on said angular portion of the shaft between said resilient blocks adapted to rock with the shaft, and a valve member carried by said arm in position for shutting off the passage of water through said housing upon a rotary movement of said rock shaft, said resilient blocks being non-rotatably connected at their inner faces with said rock shaft and non-rotatably connected at their outer faces with said housing whereby said rock shaft is rotatable only upon a torsional flexing of said blocks.

EDWARD C. ROSENOW.